United States Patent
Munje et al.

(10) Patent No.: US 9,553,969 B2
(45) Date of Patent: *Jan. 24, 2017

(54) PASSWORD METHODS AND SYSTEMS FOR USE ON A MOBILE DEVICE

(75) Inventors: Arun Munje, Ottawa (CA); Trevor Plestid, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 772 days.

This patent is subject to a terminal disclaimer.

(21) Appl. No.: 12/690,211

(22) Filed: Jan. 20, 2010

(65) Prior Publication Data

US 2010/0122350 A1    May 13, 2010

Related U.S. Application Data

(63) Continuation of application No. 11/181,522, filed on Jul. 14, 2005, now Pat. No. 7,665,146.

(51) Int. Cl.
*G06F 21/00* (2013.01)
*H04M 1/66* (2006.01)
*H04M 1/725* (2006.01)
*H04M 3/38* (2006.01)

(52) U.S. Cl.
CPC .......... *H04M 1/66* (2013.01); *H04M 1/72519* (2013.01); *H04M 3/382* (2013.01)

(58) Field of Classification Search
CPC .......... H04L 9/088; H04L 9/32; H04L 9/3226; H04M 1/72519; H04M 3/382; H04M 1/66
USPC ................................ 726/28, 8, 17; 713/184
See application file for complete search history.

(56) References Cited

U.S. PATENT DOCUMENTS

| | | | | |
|---|---|---|---|---|
| 5,090,049 A | * | 2/1992 | Chen | H04N 1/32363 358/400 |
| 5,606,614 A | * | 2/1997 | Brady | G06Q 20/341 235/380 |
| 5,613,012 A | * | 3/1997 | Hoffman | G06F 21/32 235/380 |
| 5,627,517 A | * | 5/1997 | Theimer | G01S 13/78 340/426.2 |
| 5,731,575 A | * | 3/1998 | Zingher | G06Q 20/341 235/379 |
| 5,838,812 A | * | 11/1998 | Pare, Jr. | G06F 21/32 382/115 |
| 5,933,498 A | * | 8/1999 | Schneck | G06F 21/10 705/54 |
| 5,978,919 A | * | 11/1999 | Doi | G06F 21/31 726/36 |
| 6,032,035 A | * | 2/2000 | Webster | G08B 21/02 379/37 |

(Continued)

OTHER PUBLICATIONS

Canada Office Action; Canadian Application No. 2,512,197; Sep. 27, 2010; 3 pgs.

(Continued)

*Primary Examiner* — David Garcia Cervetti
(74) *Attorney, Agent, or Firm* — Conley Rose, P.C.; J. Robert Brown, Jr.

(57) ABSTRACT

Systems and methods for operation upon a mobile device to handle a duress situation caused by another person. An input password is received from a user. The input password is decoded by the device. Responsive to the input password being a duress indication, a duress operation is performed to protect data on the mobile device.

15 Claims, 9 Drawing Sheets

(56) References Cited

U.S. PATENT DOCUMENTS

| | | | | |
|---|---|---|---|---|
| 6,068,184 A * | 5/2000 | Barnett | G06Q 20/341 | 235/379 |
| 6,175,308 B1 * | 1/2001 | Tallman | B60R 25/102 | 340/426.2 |
| 6,314,409 B2 * | 11/2001 | Schneck | G06F 21/10 | 380/259 |
| 6,400,270 B1 * | 6/2002 | Person | A45C 11/184 | 340/531 |
| 6,420,971 B1 * | 7/2002 | Leck | E05B 39/04 | 340/542 |
| 6,529,136 B2 * | 3/2003 | Cao | G01C 21/20 | 340/686.1 |
| 6,550,671 B1 * | 4/2003 | Brown | G07D 11/0066 | 235/379 |
| 6,679,422 B2 * | 1/2004 | Brown | G07F 19/207 | 235/379 |
| 6,693,545 B2 * | 2/2004 | Brown | G08B 25/08 | 340/539.11 |
| 6,732,278 B2 * | 5/2004 | Baird, III | H04L 63/083 | 713/182 |
| 6,810,392 B1 * | 10/2004 | Piggott | G06F 8/30 | 704/8 |
| 6,871,288 B2 * | 3/2005 | Russikoff | G07F 7/10 | 340/5.41 |
| 7,317,419 B2 * | 1/2008 | Sugar | G01S 5/0252 | 342/452 |
| 7,603,565 B2 * | 10/2009 | Baird, III | H04L 63/083 | 713/183 |
| 7,665,146 B2 * | 2/2010 | Munje | H04M 1/66 | 455/410 |
| 7,707,108 B2 * | 4/2010 | Brown | G06Q 20/04 | 235/379 |
| 7,726,557 B2 * | 6/2010 | Bosch | G06Q 20/105 | 235/379 |
| 7,818,783 B2 * | 10/2010 | Davis | H04L 63/0853 | 340/5.2 |
| 7,848,763 B2 * | 12/2010 | Fournier | H04M 1/72527 | 455/12.1 |
| 7,948,938 B2 * | 5/2011 | Brown | G06F 21/31 | 340/426.12 |
| 8,087,068 B1 * | 12/2011 | Downey | H04L 63/083 | 726/4 |
| 8,162,207 B2 * | 4/2012 | Bosch | G06Q 20/105 | 235/379 |
| 8,255,695 B2 * | 8/2012 | Brown | G06F 21/46 | 713/168 |
| 2002/0002683 A1 * | 1/2002 | Benson | G06F 21/86 | 713/194 |
| 2002/0012555 A1 * | 1/2002 | Lee | G03G 15/553 | 400/76 |
| 2002/0112183 A1 * | 8/2002 | Baird, III | H04L 63/083 | 726/9 |
| 2002/0169706 A1 * | 11/2002 | Chandra | G06Q 40/04 | 705/37 |
| 2002/0170954 A1 * | 11/2002 | Zingher | G06Q 20/341 | 235/375 |
| 2002/0178385 A1 * | 11/2002 | Dent | G07C 9/00309 | 726/27 |
| 2003/0016802 A1 * | 1/2003 | Furukawa | H04M 1/652 | 379/188 |
| 2003/0043034 A1 * | 3/2003 | Baker | G08B 25/08 | 340/539.1 |
| 2003/0065934 A1 * | 4/2003 | Angelo | H04L 63/12 | 726/35 |
| 2003/0098774 A1 * | 5/2003 | Chornenky | G07C 9/00111 | 340/5.1 |
| 2003/0117280 A1 * | 6/2003 | Prehn | G08B 13/19656 | 340/540 |
| 2003/0141362 A1 * | 7/2003 | Brown | G06Q 10/107 | 235/380 |
| 2003/0141372 A1 * | 7/2003 | Brown | G07F 19/207 | 235/487 |
| 2003/0141977 A1 * | 7/2003 | Brown | G08B 25/08 | 340/574 |
| 2003/0144952 A1 * | 7/2003 | Brown | G06Q 20/04 | 705/40 |
| 2003/0169161 A1 * | 9/2003 | Brown | B60R 25/1003 | 340/426.12 |
| 2003/0208439 A1 * | 11/2003 | Rast | G06Q 20/04 | 705/38 |
| 2004/0038664 A1 * | 2/2004 | Stoks | G08B 25/08 | 455/404.1 |
| 2004/0053654 A1 * | 3/2004 | Kokumai | G06F 21/31 | 463/1 |
| 2004/0133495 A1 * | 7/2004 | Bosch | G06Q 20/105 | 705/35 |
| 2004/0168067 A1 * | 8/2004 | Russikoff | G07F 7/10 | 713/183 |
| 2004/0230807 A1 * | 11/2004 | Baird, III | H04L 63/083 | 713/182 |
| 2004/0252013 A1 * | 12/2004 | Fuks | B60N 2/002 | 340/5.52 |
| 2004/0252628 A1 * | 12/2004 | Detzler | G06F 21/554 | 369/288 |
| 2005/0001717 A1 * | 1/2005 | Bohbot | G08B 13/19645 | 340/531 |
| 2005/0245229 A1 * | 11/2005 | Brown | G06F 21/31 | 455/404.1 |
| 2005/0274796 A1 * | 12/2005 | Miyashita | G06F 21/31 | 235/382 |
| 2005/0287980 A1 * | 12/2005 | Wood | H04M 1/72541 | 455/404.1 |
| 2006/0019634 A1 * | 1/2006 | Hawkes | G06F 21/305 | 455/411 |
| 2006/0075230 A1 * | 4/2006 | Baird | H04L 63/083 | 713/168 |
| 2006/0080525 A1 * | 4/2006 | Ritter | G06F 21/32 | 713/155 |
| 2007/0015490 A1 * | 1/2007 | Munje | H04M 1/66 | 455/410 |
| 2007/0130618 A1 * | 6/2007 | Chen | G06F 21/36 | 726/8 |
| 2008/0219122 A1 * | 9/2008 | Detzler | G06F 21/554 | 369/83 |
| 2010/0241562 A1 * | 9/2010 | Bosch | G06Q 20/105 | 705/41 |
| 2011/0119759 A1 * | 5/2011 | McKeeth | G06F 21/31 | 726/19 |
| 2012/0237092 A1 * | 9/2012 | Bechtel | G06K 9/00013 | 382/126 |

OTHER PUBLICATIONS

Munje, Arun, et al.; U.S. Appl. No. 11/181,522, filed Jul. 5, 2005; Title: Password Methods and Systems for Use on a Mobile Device.

Office Action dated Dec. 11, 2008; U.S. Appl. No. 11/181,522, filed Jul. 14, 2005; 10 pages.

Notice of Allowance dated Sep. 30, 2009; U.S. Appl. No. 11/181,522, filed Jul. 14, 2005; 7 pages.

Canadian Office Action; Application No. 2,512,197; Feb. 3, 2009; 4 pages.

Canadian Office Action; Application No. 2,512,197; Mar. 26, 2012; 2 pages.

* cited by examiner

PASSWORD METHODS AND SYSTEMS FOR USE ON A MOBILE DEVICE

CROSS REFERENCE TO RELATED APPLICATIONS

This application is a continuation of U.S. patent application Ser. No. 11/118,522 filed on Jul. 14, 2005 by Arun Munje, et al. entitled, "Password Methods and Systems for Use on a Mobile Device", now U.S. Pat. No. 7,665,146 issued on Feb. 16, 2010 which is incorporated by reference herein as if reproduced in its entirety.

BACKGROUND

Technical Field

This disclosure relates generally to mobile device operations, and in particular, to handling duress situations involving a mobile device.

Description of the Related Art

Mobile devices (e.g., personal digital assistants (PDAs), cellular phones, mobile messaging devices, etc.) often carry sensitive information that could be the target of theft. A user of the mobile device in such a duress situation may desire to erase his or her data from the mobile device. However, an owner could be put at physical risk from a thief if the thief should become aware that the user is trying to erase data from the device or otherwise trying to impair the operational capability of the device.

BRIEF DESCRIPTION OF THE DRAWINGS

The same reference numerals are used in different figures to refer to similar elements.

DETAILED DESCRIPTION

Figure 1:
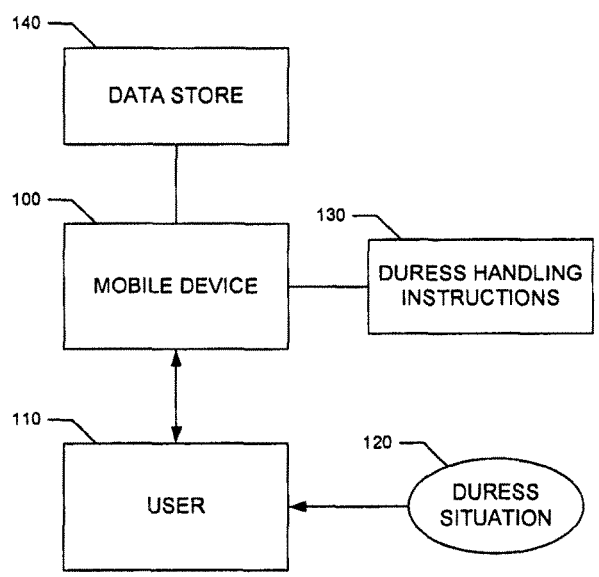
FIG. 1 is a block diagram depicting a mobile device configured to handle a duress situation from a user.

FIG. 1 depicts a system wherein a mobile device 100 is configured to handle a user 110 in a duress situation 120. Upon encountering a duress situation 120, the user 110 responds by sending a duress indication to the mobile device 100. The duress indication may trigger the mobile device 100 to retrieve duress handling instructions 130 to handle the duress situation.

A duress situation 120 can occur in a variety of circumstances. A few examples of duress situations 120 include, among others: intimidation, theft, robbery, and kidnapping. However, it should be noted that these are merely examples of various duress situations 120 and should not be read as limiting the scope of this disclosure.

The duress indication can be a variation on the user's authorization password. Numerous types of password variants could be used. A few examples of such password variants are discussed below. The duress indication may further include a degree associated with the duress situation 120. The degree could signal the seriousness of the situation 120. For example, the duress indication could indicate a low-level duress situation, a high-level duress situation, or any level in-between.

Figure 2:
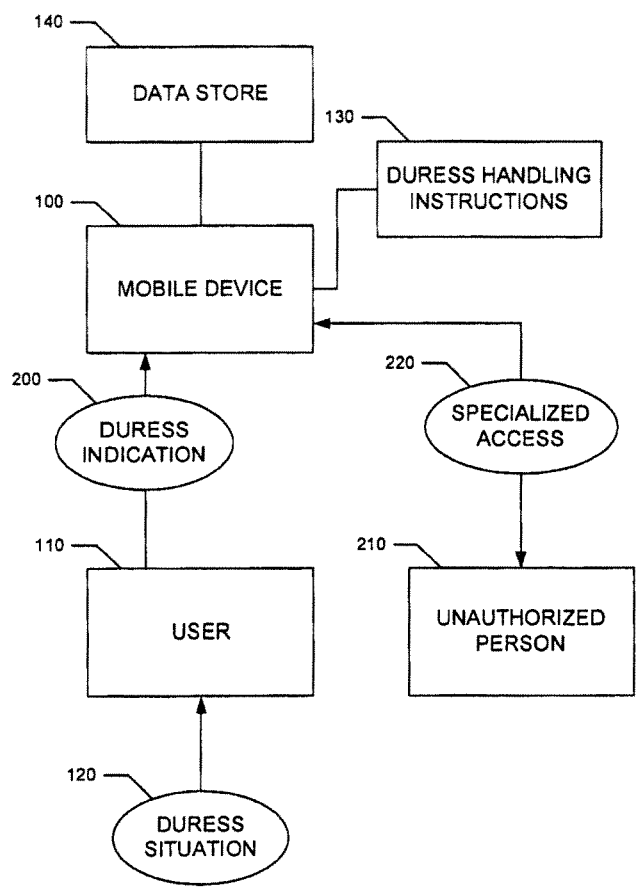
FIG. 2 is a block diagram depicting specialized access to a mobile device in response to a duress situation.

As shown in greater detail in FIG. 2, duress handling instructions 130 can receive a duress indication 200 from the user 110 via the mobile device 100. It should be noted that the duress indication could also be received from the unauthorized user 210. Such a situation can be the case where the unauthorized user 210 steals the device and attempts to force the user 100 to disclose a password to unlock the device.

The duress indication 200 indicates a duress situation 120 is occurring, and can also indicate the seriousness of the duress situation 120. Upon receiving the duress indication 200 from the user 110, duress handling instructions 130 instruct the mobile device on how to respond to the duress situation 120. Duress handling instructions 130 can include, for example: causing the device to appear broken; deleting or changing data stored in the data store 140 which was previously flagged as sensitive by the user; silently alerting the police to the situation; etc. Moreover, duress handling instructions 130 may include a timer, which can delay some of the actions taken by one or more duress handling instructions 130, such that the user 110 may not be in the presence of the unauthorized person 210 when the duress handling instructions 130 are executed.

A mobile device 100 can be configured to perform only the duress operation(s) that corresponds to a particular duress level. As an illustration, the mobile device 100 may perform only one or the following duress operations for a low-level duress situation (e.g., a level 1 duress situation): instructing the mobile device's interface to display false information, instructing the interface to produce output to the user which causes the device to appear broken, instructing a communications interface associated with the mobile communications device to notify a public safety answering point, instructing the mobile communications device to delete information from a storage device on the mobile communications device after a delay period of time. An intermediate level duress indication may indicate that the mobile device 100 performs only several of the duress operations (e.g., deletion of only sensitive data and sending notification to a public safety answering point). The highest level duress indication may perform even more severe duress operations (e.g., deletion of all data; pretending to be broken after a delay period of time; notifying a public safety answering point; providing location information; etc.).

After the mobile device 100 performs the instructions specified by the duress handling instructions 130, the mobile device 100 appears to provide access to the unauthorized user 210. However, the access given to the unauthorized user is a specialized type of access 220. The specialized access 220 is specified by duress handling instructions 130, which can alter or even eliminate the unauthorized user's 210 access to the data store 140 or to certain applications/operations of the mobile device 100.

Figure 3:
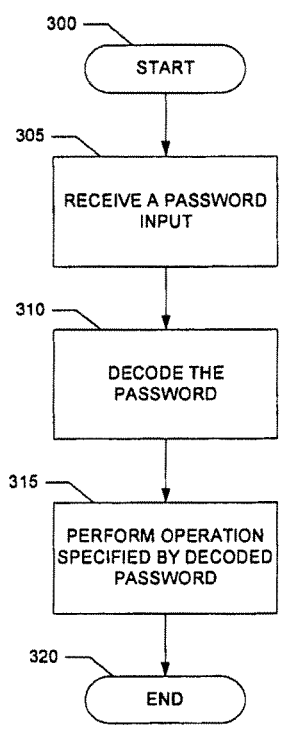
FIGS. 3-6 are flowcharts depicting operational scenarios for handling duress situations.

FIG. 3 is a flowchart illustrating an operational scenario for handling a duress-indicative password received from a person in possession of a mobile device. The process for this operational scenario begins at step 300. At step 305, a mobile communications device interface receives password input from a user. The user would typically be the person with whom the device is associated. The user could be under duress from a thief or other person who is causing a duress situation. In such situations, the user often does not wish to anger the thief, and therefore may perform what the thief wishes relative to the device.

Upon receiving the input password from the user, the mobile communications device decodes the password in step 310. For example, the mobile communications device can check the input password against an authentic unlocking password, and unlock the mobile communications device upon determining that there exists an identity between the input password and the device's authentic unlocking password. The mobile communications device could also decode the password by determining that there is not an identity between the input password and the authentic password; the device can then determine if there is an identity between the input password and a password variant. It should be noted that the device could be checking for more than one password variant.

If there is a determination that a duress password variant has been used, then the mobile communications device performs one or more duress operations, as shown in step 315. A duress operation as determined by the decoding step is designed to not notify the thief that the user has used a duress password. This secrecy can be achieved in many ways, such as by delaying the response of the mobile communications device to the duress password detection. After this delay the mobile communications device can delete all or most data stored on the device.

The device could also present the appearance of being broken (e.g., inoperable). The appearance of being broken could be produced by sending misleading error messages to the display. Misleading error messages could indicate that the device cannot access a message, or that data files have been corrupted. The device could, instead or in addition, insert misleading, false or erroneous content into the data, by searching for and changing dates, proper names, or other formatted data. Another approach to maintain the secrecy of the user's duress indication includes deletion of not all data, but only sensitive information. The information which could be considered sensitive is that information which has been marked by the user (or another person or automatically by a program) as sensitive. For example, an electronic message with sensitive information could be marked with a flag indicating the sensitivity of the message. Non-sensitive message would be retained, such that the device would display no outward evidence of the duress indication.

Another duress operation could include sending distress messages to a public safety answering point (PSAP) requesting help. Using an Enhanced 911 (E-911) location technology (which enables emergency responders to locate a geographic position associated with the caller) or by using an automatic location identification (ALI) as required by the Federal Communications Commission (FCC) as of 2001, a mobile phone company can locate a cellular phone to within a predetermined distance of its position. A mobile communications device can also continue to send distress messages such that the mobile phone company can track the user. The continued stream of distress messages could be used if user is being kidnapped. A system could be configured such that email messages are sent back to the enterprise, or to preselected 'duress email recipients' or P2P messages, or SMS/MMS messages could be used as a message recipients for a duress operation.

Any of the duress operations described above can be implemented alone, or in combination with one or more of the other duress operations described, except where the operations are clearly incompatible (e.g., deletion of all data and deletion of some data). For example, the mobile communications device interface could send an E-911 message to a PSAP, and can further give the appearance of being broken.

After performing a duress operation as determined by the decoding step 310, this example operational scenario ends at step 320. The process can be started again at step 300 after the mobile communications device has been placed into a secure mode, such as by the user or by automatically entering a secure mode after a period of inactivity.

Figure 4:
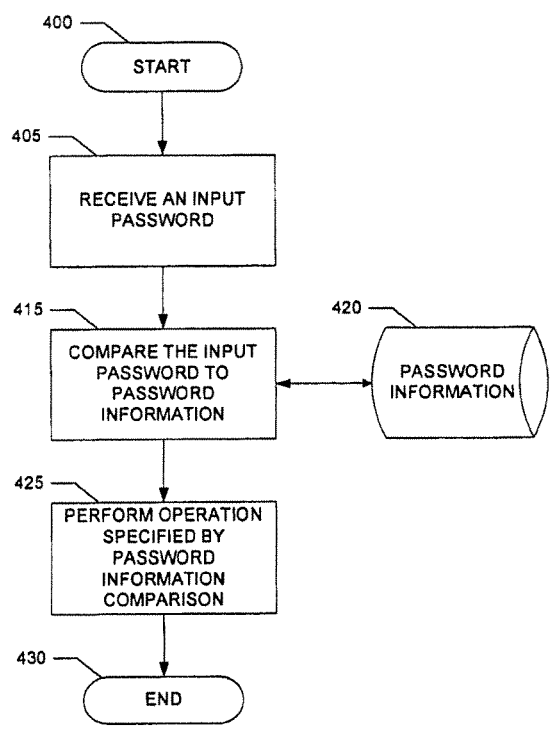

FIG. 4 illustrates an operational scenario of a mobile communications device that begins at step 400. A mobile communications device interface receives an input password in step 405 as entered by a user. The password could be input via a keypad. The keypad can be alphanumeric, but can be arranged in many different types of configurations. It should be understood, however, that in other operational scenarios, the password could be input via any interface enabling the user to provide data to the mobile communications device.

After receiving the input password from the user, the mobile communications device compares the input password to the password information stored in a storage device 420. The storage device can be any volatile or non-volatile memory device capable of retaining information regarding the user's password and any password variants. A mobile communications device interface may enable the user to set up the password along with any password variant(s). In some mobile communications devices, the set up can include both setting the password and password variants, and specifying the duress operation(s) and duress levels associated with the password variant(s).

After comparing the input password to the password information from the storage device 420, the mobile communications device performs an operation based upon associated the password information comparison step 425. When the input password matches the authentic password, the mobile communications device is unlocked. However, if the input password matches a password variant, a duress operation is performed. Again, the duress operation is secretive, such that the thief will not be alerted to the activation of the duress feature of the mobile communications device. If the duress password was input by mistake, the user can provide additional input to the device to stop the duress operation(s).

Upon performing the duress operation as determined by the comparison step 420, the operational scenario ends at step 430. The operational scenario can be started again at step 400 after the mobile communications device has been placed into a secure mode, such as by the user or by automatically entering a secure mode after a period of inactivity.

Figure 5:
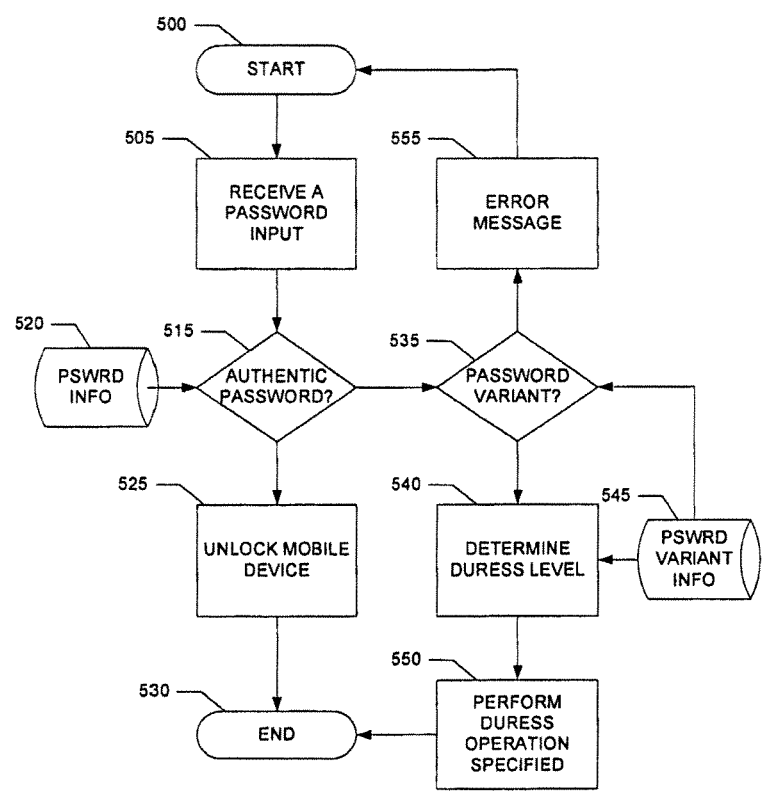

FIG. 5 illustrates an operational scenario associated with a mobile communications device operable to detect a duress password. The operational scenario begins at step 500. In step 505, a mobile communications device interface receives a password from a user. In step 515, the mobile communications device determines whether the input password matches an authentic password stored in memory 520.

If the input password matches the authentic password from memory 520, the mobile communications device interface unlocks the device as shown in step 525. After unlocking the device in step 525, the process ends at step 530. The operational scenario can be started again at step 500 when the user places the mobile communications device interface into a secure mode. Alternatively, the mobile communications device can determine that a secure mode should be entered according to its own programming.

If the input password does not match the authentic password in step 515, the operational scenario proceeds to step 535, wherein the mobile communications device interface determines whether the input password matches a duress password (e.g., a password variant) stored in memory 545. It should be noted that memory 520 and memory 545 could be the same memory.

Upon determination that the input password matches a duress password stored in memory 545, the operational scenario proceeds to step 540. The mobile communications device could determine the level of duress the user is under based upon the input password by examining password variant information. For example, each of a number of password variants can indicate a different duress operation request from the user. Thus, the user would enter a first password variant to have the mobile communications device perform a first level duress operation, or enter a second password variant to have to the mobile communications device perform a second level duress operation, etc. In some cases, among others, the password variants may be set-up by the user, along with the duress operation(s) to be performed upon entering the password variants.

The mobile communications device is then operable to perform the duress operation specified by the user using the password variant, as shown in step 550. Upon performing the duress operation specified, the process ends at step 530. The operational scenario can be started again at step 500 after the mobile communications device has been placed into a secure mode, such as by the user or by automatically entering a secure mode after a period of inactivity.

If the input password is determined not to be an authentic password in step 515, or a password variant in step 535, the mobile communications device outputs an error message indicating that the password entered is not valid, as illustrated by step 555. Upon outputting the error message, the operational scenario returns to step 500. The operational scenario returns to step 500 because the mobile communications device interface remains in the locked position after receiving an incorrect password. Thus, the user has another chance to enter either a password which matches the authentic password or the password variant(s).

Figure 6:
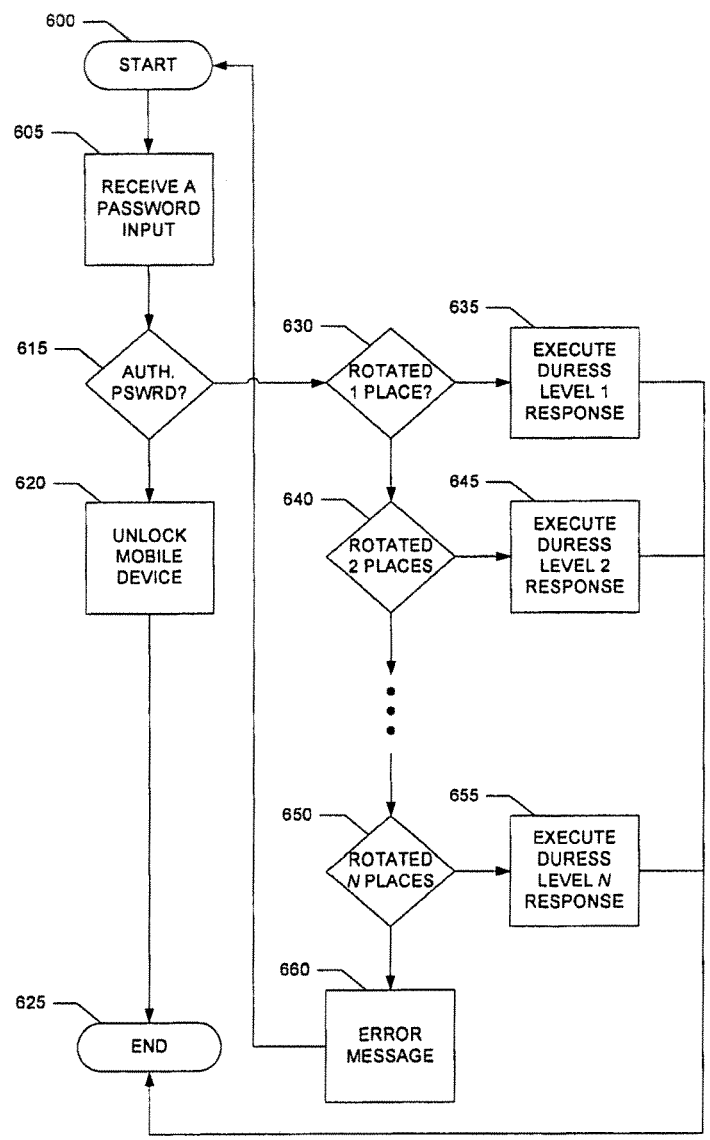

FIG. 6 illustrates an operational scenario of a mobile communications device that begins at step 600. At step 605, a mobile communications device, 605 receives an input password from a user. The mobile communications device interface, as shown in step 615, determines whether the input password is an authentic password by comparing the input password to the authentic password as stored in memory. If the input password matches the stored authentic password, the device is unlocked as illustrated in step 620. Upon unlocking the device, the mobile communications device process ends at step 625. The operational scenario can be started again at step 600 after the mobile communications device has been placed into a secure mode, such as by the user or by automatically entering a secure mode after a period of inactivity.

If the input password did not match the stored authentic password in step 615, processing proceeds to step 630. In step 630, the mobile communications device determines whether the input password matches a first degree rotated authentic password. If the input password does match the first degree rotated authentic password, the mobile communications device performs a duress operation associated with a level one response, as shown in step 635.

However, if the input password did not match the first degree rotated password, the mobile communications device proceeds to step 640. In step 640, the mobile communications device determines whether the input password matches a second degree rotated authentic password. If the input password does match the second degree rotated authentic password, the mobile communications device performs a duress operation associated with a level two response, as shown in step 645.

If the input password did not match the second degree rotated password, the mobile communications device interface proceeds to step 650. In step 650, the mobile communications device interface determines whether the input password matches an n-degree rotated authentic password. If the input password does match the n-degree rotated authentic password, the mobile communications device interface performs a duress operation associated with a level n response, as shown in step 655. Otherwise, the mobile communications device interface sends an error message to the user indicating that an invalid password was entered, as shown in step 660.

A password variant(s) can be the authentic password with a rotation applied. A rotation could be that the last character of the authentic password is the first character of a first password variant, and each of the remaining characters of the authentic password are shifted one space to the right in the password variant. Such a password variant is said to have a 1 degree rotation from the authentic password. It should be noted that an n-degree rotation removes the last n characters from the authentic password for use as the first n-characters of the n-degree password variant, with the remaining characters of the authentic password being shifted n-places to form the remainder of the n-degree password variant.

As other examples, a password variant(s) could be the authentic password with a degree inserted into the password at some (or any) point. For example, if the authentic password was "password", then a password of first degree could be "password1", "pas1sword", "passwo1rd", etc. Similarly, a password variant of fourth degree could be "pa4ssword", "pass4word", etc. The degree of the password variant can indicate a different duress operation request from the user. Still further, a system can be configured wherein a series of unique passwords are respectively associated with particular duress levels.

Figure 7:
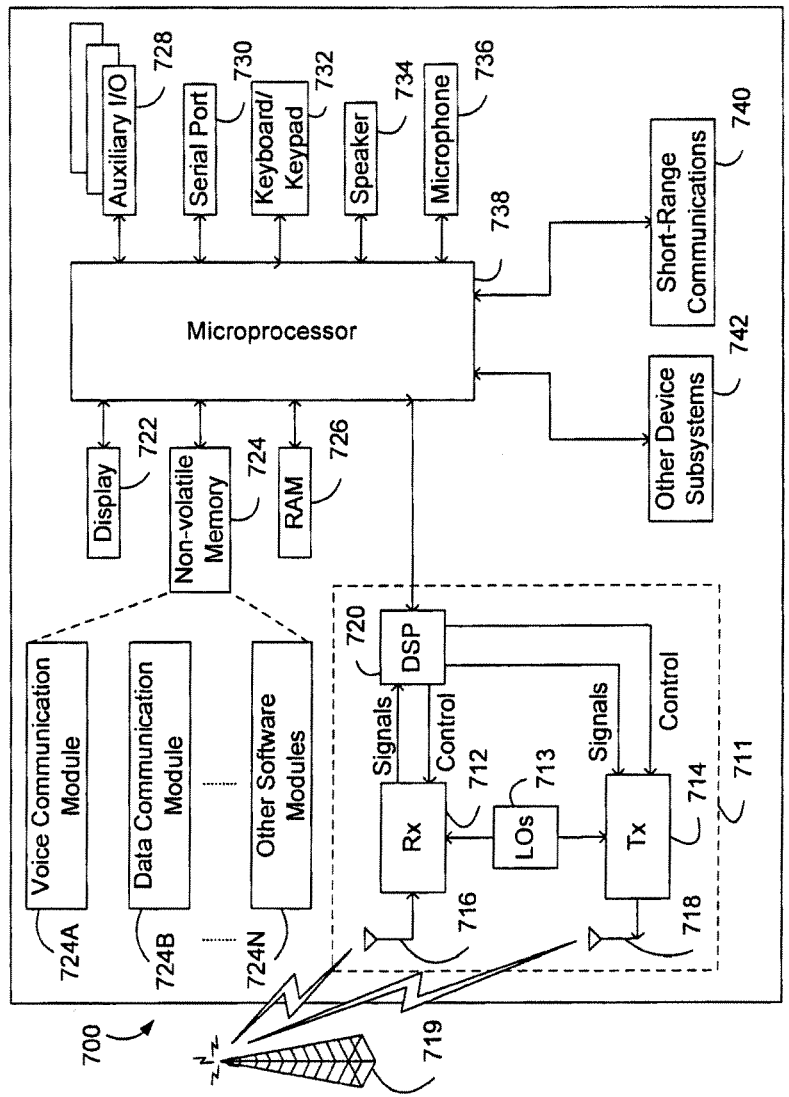
FIG. 7 is a block diagram of an example mobile device.

The systems and methods disclosed herein are presented only by way of example and are not meant to limit the scope of the invention. Other variations of the systems and methods described above will be apparent to those skilled in the art and as such are considered to be within the scope of the invention. For example a system and method can include sensing duress to a user of a mobile communications device. An input password is received from a user. The input password is decoded by the device. Responsive to the input password being a duress indication, performing a duress operation responsive to the decoded password that protects data on the mobile communications device. As another example, the systems and methods disclosed herein may be used with many different types of computers and devices, such as a wireless mobile communications device shown in FIG. 7. With reference to FIG. 7, the mobile device 700 is a dual-mode mobile device and includes a transceiver 711, a microprocessor 738, a display 722, non-volatile memory 724, random access memory (RAM) 726, one or more auxiliary input/output (I/O) devices 728, a serial port 730, a keyboard/keypad 732, a speaker 734, a microphone 736, a short-range wireless communications sub-system 740, and other device sub-systems 742.

The transceiver 711 includes a receiver 712, a transmitter 714, antennas 716 and 718, one or more local oscillators 713, and a digital signal processor (DSP) 720. The antennas 716 and 718 may be antenna elements of a multiple-element antenna, and are preferably embedded antennas. However, the systems and methods described herein are in no way restricted to a particular type of antenna, or even to wireless communication devices.

The mobile device 700 is preferably a two-way communication device having voice and data communication capabilities. Thus, for example, the mobile device 700 may communicate over a voice network, such as any of the analog or digital cellular networks, and may also communicate over a data network. The voice and data networks are depicted in FIG. 7 by the communication tower 719. These voice and data networks may be separate communication networks using separate infrastructure, such as base stations, network controllers, etc., or they may be integrated into a single wireless network.

The transceiver 711 is used to communicate with the network 719, and includes the receiver 712, the transmitter 714, the one or more local oscillators 713 and the DSP 720. The DSP 720 is used to send and receive signals to and from the transceivers 716 and 718, and also provides control information to the receiver 712 and the transmitter 714. If the voice and data communications occur at a single frequency, or closely-spaced sets of frequencies, then a single local oscillator 713 may be used in conjunction with the receiver 712 and the transmitter 714. Alternatively, if different frequencies are utilized for voice communications versus data communications for example, then a plurality of local oscillators 713 can be used to generate a plurality of frequencies corresponding to the voice and data networks 719. Information, which includes both voice and data information, is communicated to and from the transceiver 711 via a link between the DSP 720 and the microprocessor 738.

The detailed design of the transceiver 711, such as frequency band, component selection, power level, etc., will be dependent upon the communication network 719 in which the mobile device 700 is intended to operate. For example, a mobile device 100 intended to operate in a North American market may include a transceiver 711 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 719, the access requirements for the mobile device 700 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 719, other than any legally required operations, such as '911' emergency calling.

After any required network registration or activation procedures have been completed, the mobile device 700 may the send and receive communication signals, including both voice and data signals, over the networks 719. Signals received by the antenna 716 from the communication network 719 are routed to the receiver 712, which provides signal amplification, frequency down conversion, filtering, channel selection, etc., and may also provide analog to digital conversion. Analog to digital conversion of the received signal allows more complex communication functions, such as digital demodulation and decoding to be performed using the DSP 720. In a similar manner, signals to be transmitted to the network 719 are processed, including modulation and encoding, for example, by the DSP 720 and are then provided to the transmitter 714 for digital to analog conversion, frequency up conversion, filtering, amplification and transmission to the communication network 719 via the antenna 718.

In addition to processing the communication signals, the DSP 720 also provides for transceiver control. For example, the gain levels applied to communication signals in the receiver 712 and the transmitter 714 may be adaptively controlled through automatic gain control algorithms implemented in the DSP 720. Other transceiver control algorithms could also be implemented in the DSP 720 in order to provide more sophisticated control of the transceiver 711.

The microprocessor 738 preferably manages and controls the overall operation of the mobile device 700. Many types of microprocessors or microcontrollers could be used here, or, alternatively, a single DSP 720 could be used to carry out the functions of the microprocessor 738. Low-level communication functions, including at least data and voice communications, are performed through the DSP 720 in the transceiver 711. Other, high-level communication applications, such as a voice communication application 724A, and a data communication application 724B may be stored in the non-volatile memory 724 for execution by the microprocessor 738. For example, the voice communication module 724A may provide a high-level user interface operable to transmit and receive voice calls between the mobile device 700 and a plurality of other voice or dual-mode devices via the network 719. Similarly, the data communication module 724B may provide a high-level user interface operable for sending and receiving data, such as e-mail messages, files, organizer information, short text messages, etc., between the mobile device 700 and a plurality of other data devices via the networks 719.

The microprocessor 738 also interacts with other device subsystems, such as the display 722, the RAM 726, the auxiliary input/output (I/O) subsystems 728, the serial port 730, the keyboard/keypad 732, the speaker 734, the microphone 736, the short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as the keyboard/keypad 732 and the display 722 may be used for both communication-related functions, such as entering a text message for transmission over a data communication network, and device-resident functions such as a calculator or task list or other PDA type functions.

Operating system software used by the microprocessor 738 is preferably stored in a persistent store such as non-volatile memory 724. The non-volatile memory 724 may be implemented, for example, as a Flash memory component, or as battery backed-up RAM. In addition to the operating system, which controls low-level functions of the mobile device 710, the non-volatile memory 724 includes a plurality of software modules 724A-724N that can be executed by the microprocessor 738 (and/or the DSP 720), including a voice communication module 724A, a data communication module 724B, and a plurality of other operational modules 724N for carrying out a plurality of other functions. These modules are executed by the microprocessor 738 and provide a high-level interface between a user and the mobile device 700. This interface typically includes a graphical component provided through the display 722, and an input/output component provided through the auxiliary I/O 728, keyboard/keypad 732, speaker 734, and microphone 736. The operating system, specific device applications or modules, or parts thereof, may be temporarily loaded into a volatile store, such as RAM 726 for faster operation. Moreover, received communication signals may also be temporarily stored to RAM 726, before permanently writing them to a file system located in a persistent store such as the Flash memory 724.

An exemplary application module 724N that may be loaded onto the mobile device 700 is a personal information manager (PIM) application providing PDA functionality, such as calendar events, appointments, and task items. This module 724N may also interact with the voice communication module 724A for managing phone calls, voice mails, etc., and may also interact with the data communication module for managing e-mail communications and other data transmissions. Alternatively, all of the functionality of the voice communication module 724A and the data communication module 724B may be integrated into the PIM module.

The non-volatile memory 724 preferably also provides a file system to facilitate storage of PIM data items on the device. The PIM application preferably includes the ability to send and receive data items, either by itself, or in conjunction with the voice and data communication modules 724A, 724B, via the wireless networks 719. The PIM data items are preferably seamlessly integrated, synchronized and updated, via the wireless networks 719, with a corresponding set of data items stored or associated with a host computer system, thereby creating a mirrored system for data items associated with a particular user.

Context objects representing at least partially decoded data items, as well as fully decoded data items, are preferably stored on the mobile device 700 in a volatile and non-persistent store such as the RAM 726. Such information may instead be stored in the non-volatile memory 724, for example, when storage intervals are relatively short, such that the information is removed from memory soon after it is stored. However, storage of this information in the RAM 726 or another volatile and non-persistent store is preferred, in order to ensure that the information is erased from memory when the mobile device 700 loses power. This prevents an unauthorized party from obtaining any stored decoded or partially decoded information by removing a memory chip from the mobile device 700, for example.

The mobile device 700 may be manually synchronized with a host system by placing the device 100 in an interface cradle, which couples the serial port 730 of the mobile device 700 to the serial port of a computer system or device. The serial port 730 may also be used to enable a user to set preferences through an external device or software application, or to download other application modules 724N for installation. This wired download path may be used to load an encryption key onto the device, which is a more secure method than exchanging encryption information via the wireless network 719. Interfaces for other wired download paths may be provided in the mobile device 700, in addition to or instead of the serial port 730. For example, a USB port would provide an interface to a similarly equipped personal computer.

Additional application modules 724N may be loaded onto the mobile device 700 through the networks 719, through an auxiliary I/O subsystem 728, through the serial port 730, through the short-range communications subsystem 740, or through any other suitable subsystem 742, and installed by a user in the non-volatile memory 724 or RAM 726. Such flexibility in application installation increases the functionality of the mobile device 700 and may provide enhanced on-device functions, communication-related functions, or both. For example, secure communication applications may enable electronic commerce functions and other such financial transactions to be performed using the mobile device 700.

When the mobile device 700 is operating in a data communication mode, a received signal, such as a text message or a web page download, is processed by the transceiver module 711 and provided to the microprocessor 738, which preferably further processes the received signal in multiple stages as described above, for eventual output to the display 722, or, alternatively, to an auxiliary I/O device 728. A user of mobile device 100 may also compose data items, such as e-mail messages, using the keyboard/keypad 732, which is preferably a complete alphanumeric keyboard/keypad laid out in the QWERTY style, although other styles of complete alphanumeric keyboards/keypads such as the known DVORAK style may also be used. User input to the mobile device 700 is further enhanced with a plurality of auxiliary I/O devices 728, which may include a thumbwheel input device, a touchpad, a variety of switches, a rocker input switch, etc. The composed data items input by the user may then be transmitted over the communication networks 719 via the transceiver module 711.

When the mobile device 700 is operating in a voice communication mode, the overall operation of the mobile device is substantially similar to the data mode, except that received signals are preferably be output to the speaker 734 and voice signals for transmission are generated by a microphone 736. Alternative voice or audio I/O subsystems, such as a voice message recording subsystem, may also be implemented on the mobile device 700. Although voice or audio signal output is preferably accomplished primarily through the speaker 734, the display 722 may also be used to provide an indication of the identity of a calling party, the duration of a voice call, or other voice call related information. For example, the microprocessor 738, in conjunction with the voice communication module and the operating system software, may detect the caller identification information of an incoming voice call and display it on the display 722.

A short-range communications subsystem 740 is also included in the mobile device 700. The subsystem 740 may include an infrared device and associated circuits and components, or a short-range RF communication module such as a Bluetooth™ module or an 802.11 module, for example, to provide for communication with similarly-enabled systems and devices. It should be appreciated that "Bluetooth" and "802.11" refer to sets of specifications, available from the Institute of Electrical and Electronics Engineers, relating to wireless personal area networks and wireless local area networks, respectively.

Figure 8:
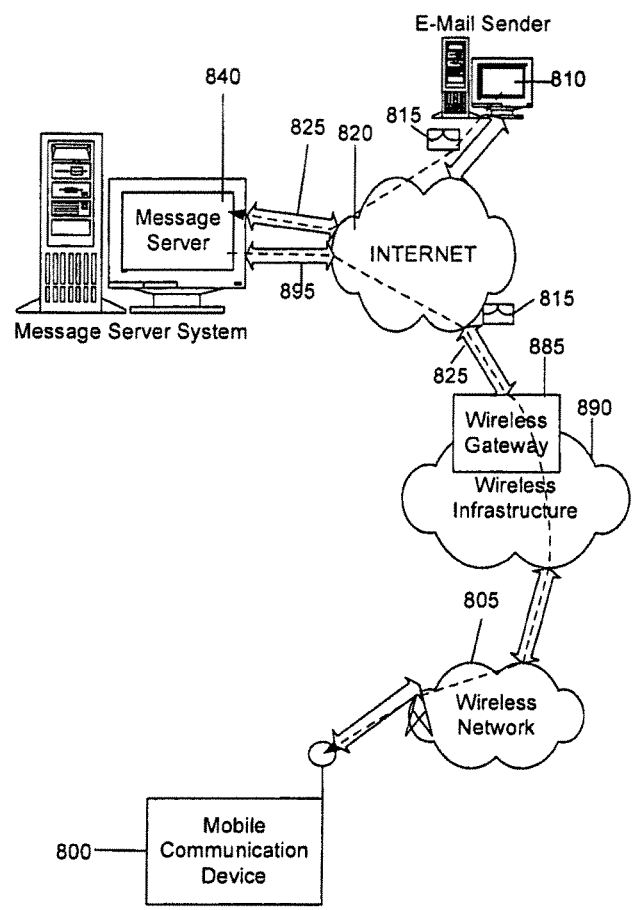
FIG. 8 is an overview of an example communication system in which a mobile device may be used.

FIG. 8 is an overview of an example communication system in which a mobile device may be used. One skilled in the art will appreciate that there may be hundreds of different topologies, but the system shown in FIG. 8 helps demonstrate the operation of the encoded message processing systems and methods described in the present application. There may also be many message senders and recipients. The simple system shown in FIG. 8 is for illustrative purposes only, and shows perhaps the most prevalent Internet e-mail environment where security is not generally used.

FIG. 8 shows an e-mail sender 810, the Internet 820, a message server system 840, a wireless gateway 885, wireless infrastructure 890, a wireless network 805 and a mobile communication device 800.

An e-mail sender system 810 may, for example, be connected to an ISP (Internet Service Provider) on which a user of the system 810 has an account, located within a company, possibly connected to a local area network (LAN), and connected to the Internet 820, or connected to the Internet 820 through a large ASP (application service provider) such as America Online (AOL). Those skilled in the art will appreciate that the systems shown in FIG. 8 may instead be connected to a wide area network (WAN) other than the Internet, although e-mail transfers are commonly accomplished through Internet-connected arrangements as shown in FIG. 8.

The message server 840 may be implemented, for example, on a network computer within the firewall of a corporation, a computer within an ISP or ASP system or the like, and acts as the main interface for e-mail exchange over the Internet 820. Although other messaging systems might not require a message server system 840, a mobile device 800 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 8, as they do not directly play a role in the secure message processing described below. Message servers such as server 840 typically extend beyond just e-mail sending and receiving; they also include dynamic database storage engines that have predefined database formats for data like calendars, to-do lists, task lists, e-mail and documentation.

The wireless gateway 885 and infrastructure 890 provide a link between the Internet 820 and wireless network 805. The wireless infrastructure 90 determines the most likely network for locating a given user and tracks the user as they roam between countries or networks. A message is then delivered to the mobile device 800 via wireless transmission, typically at a radio frequency (RF), from a base station in the wireless network 805 to the mobile device 800. The particular network 805 may be virtually any wireless network over which messages may be exchanged with a mobile communication device.

As shown in FIG. 8, a composed e-mail message 815 is sent by the e-mail sender 810, located somewhere on the Internet 820. This message 815 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 815 arrives at the message server 840 and is normally stored in a message store. Most known messaging systems support a so-called "pull" message access scheme, wherein the mobile device 800 must request that stored messages be forwarded by the message server to the mobile device 800. Some systems provide for automatic routing of such messages which are addressed using a specific e-mail address associated with the mobile device 800. In a preferred embodiment described in further detail below, messages addressed to a message server account associated with a host system such as a home computer or office computer which belongs to the user of a mobile device 800 are redirected from the message server 840 to the mobile device 800 as they are received.

Regardless of the specific mechanism controlling the forwarding of messages to the mobile device 800, the message 815, or possibly a translated or reformatted version thereof, is sent to the wireless gateway 885. The wireless infrastructure 890 includes a series of connections to wireless network 805. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 9:
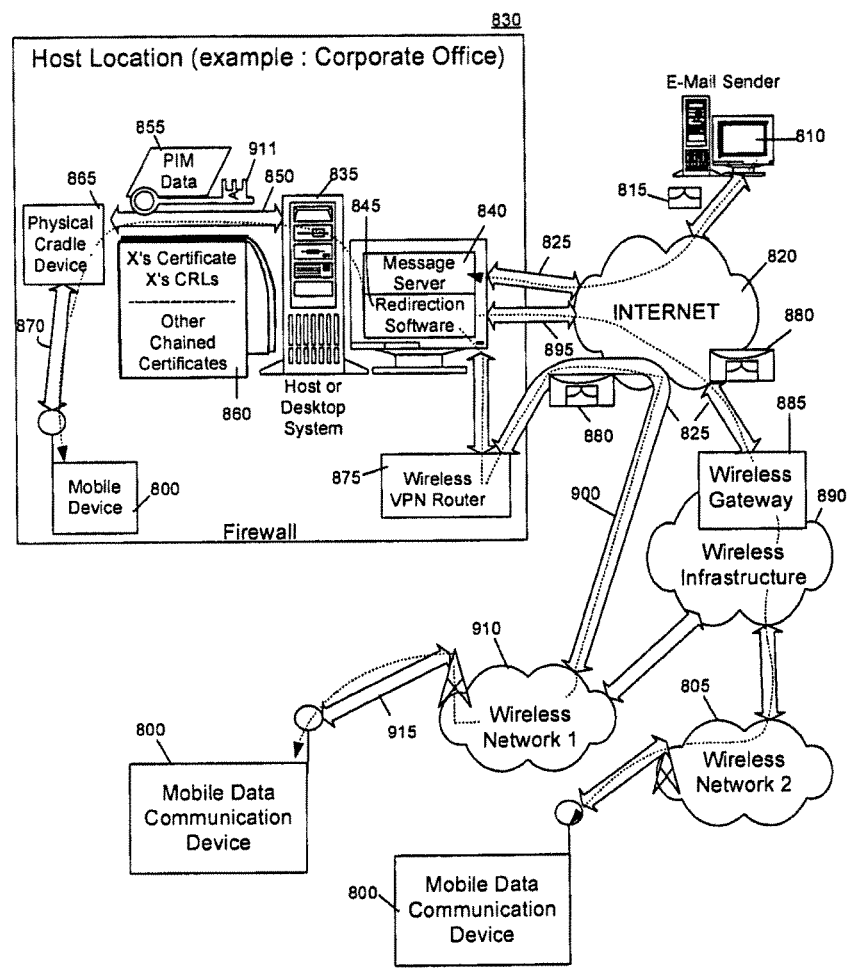
FIG. 9 is a block diagram of another example communication system in which a mobile device may be used.

FIG. 9 is a block diagram of a further example communication system including multiple networks and multiple mobile communication devices. FIG. 9 shows a host system 830, a redirection program 845, a mobile device cradle 865, a wireless virtual private network (VPN) router 875, an additional wireless network 910 and multiple mobile communication devices 800. As described above in conjunction with FIG. 8, FIG. 9 represents an overview of an example network topology. Although the encoded message processing systems and methods described herein may be applied to networks having many different topologies, the network of FIG. 9 is useful in understanding an automatic e-mail redirection system mentioned briefly above.

The central host system 830 can be a corporate office or other LAN, but may instead be a home office computer or some other private system where mail messages are being exchanged. Within the host system 830 is the message server 840, running on some computer within the firewall of the host system, that acts as the main interface for the host system to exchange e-mail with the Internet 820. The redirection program 845 enables redirection of data items from the server 840 to a mobile communication device 800. Although the redirection program 845 is shown to reside on the same machine as the message server 840 for ease of presentation, there is no requirement that it must reside on the message server. The redirection program 845 and the message server 840 are designed to co-operate and interact to allow the pushing of information to mobile devices 800. In this installation, the redirection program 845 takes confidential and non-confidential corporate information for a specific user and redirects it out through the corporate firewall to mobile devices 800. A more detailed description of the redirection software 845 may be found in the commonly assigned U.S. Pat. No. 6,219,694 ("the '694 patent"), entitled "System and Method for Pushing Information From A Host System To A Mobile Data Communication Device Having A Shared Electronic Address," and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 800 associated with the host system 830.

As shown in FIG. 9, there may be many alternative paths for getting information to the mobile device 800. One method for loading information onto the mobile device 800 is through a port designated 870, using a device cradle 865. This method tends to be useful for bulk information updates often performed at initialization of a mobile device 800 with the host system 830 or a computer 835 within the system 830. The other main method for data exchange is over-the-air using wireless networks to deliver the information. As shown in FIG. 9, this may be accomplished through a wireless VPN router 875 or through a traditional Internet connection 895 to a wireless gateway 885 and a wireless infrastructure 890, as described above. A VPN connection 920 could be established directly through a specific wireless network 910 to a mobile device 800. A wireless VPN router 875 could be used, such as with an Internet Protocol (IP) Version 6 (IPV6) in an IP-based wireless networks. The protocol may be configured to provide enough IP addresses to dedicate an IP address to every mobile device 800 and thus make it possible to push information to a mobile device 800 at any time. A principal advantage of using this wireless VPN router 875 is that it could be an off-the-shelf VPN component, thus it would not require a separate wireless gateway 885 and wireless infrastructure 890 to be used. A VPN connection could be a Transmission Control Protocol (TCP)/IP or User Datagram Protocol (UDP)/IP connection to deliver the messages directly to the mobile device 800. If a wireless VPN router 875 is not available then a link 895 to the Internet 820 is the most common connection mechanism available and has been described above.

In the automatic redirection system of FIG. 9, a composed e-mail message 815 leaving the e-mail sender 810 arrives at the message server 840 and is redirected by the redirection program 845 to the mobile device 800. As this redirection takes place the message 815 is re-enveloped, as indicated at 880, and a possibly proprietary compression and encryption algorithm can then be applied to the original message 815. In this way, messages being read on the mobile device 800 are no less secure than if they were read on a desktop workstation such as 835 within the firewall. All messages exchanged between the redirection program 845 and the mobile device 800 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 800 allows the received message to appear as though the message originated from the user's desktop system 835 rather than the mobile device 800. A system can also be configured to reply or forward by reference, such that the mobile device need not resend the original contents over precious over the air resources, thereby also saving on battery life, whereas a reference number is used by the redirection software to forward the original email contents.

With reference back to the port 850 and cradle 865 connectivity to the mobile device 800, this connection path offers many advantages for enabling one-time data exchange of large items. For those skilled in the art of personal digital assistants (PDAs) and synchronization, the most common data exchanged over this link is Personal Information Management (PIM) data 855. When exchanged for the first time this data tends to be large in quantity, bulky in nature and requires a large bandwidth to get loaded onto the mobile device 800 where it can be used on the road. This serial link may also be used for other purposes, including setting up a private security key 911 such as an S/MIME or PGP specific private key, the Certificate (Cert) of the user and their Certificate Revocation Lists (CRLs) 860. The private key is preferably exchanged so that the desktop 835 and mobile device 800 share one personality and one method for accessing all mail. The Cert and CRLs are normally exchanged over such a link because they represent a large amount of the data that is required by the device for S/MIME, PGP and other public key security methods.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

To further illustrate the broad scope of the disclosed systems and methods, the following is provided. Program code is usually interpreted by software. However, a code processor can be implemented in hardware. Adaptation of the disclosed systems and methods to a hardware processor is within the scope of the invention. As additional examples of the wide scope of the disclosed systems and methods, a remote device can be configured to detect duress indicators from the user. Moreover, a system and method may allow for secretive communication between the device and a PSAP, thereby enabling the user to covertly send a help message to emergency response units.

The invention claimed is:

1. A computer-implemented method of executing an action on a mobile communications device based on a received password, comprising:
   identifying, at the mobile communications device, wherein the mobile communications device comprises a radio transceiver, (i) a correspondence between a first password and a first action, (ii) a correspondence between a second password and a second action, and (iii) a correspondence between a third password and a third action; wherein the first action is to unlock the mobile communications device; wherein the second action comprises one of: sending false information to a display of the mobile communications device, indicating that a user interface of the mobile communications device has failed, or sending a distress signal via the radio transceiver to a public safety answering point; and wherein the third action comprises deleting at least a portion of information stored on the mobile communications device;

receiving, at the mobile communications device, a password which is one of the first password, the second password, or the third password;

searching for a degree within the received password, the degree being a string that does not exist in a stored authentic password associated with the mobile communications device; and executing, at the mobile communications device, the action corresponding to the received password.

2. The method of claim 1, wherein identifying (i) a correspondence between a first password and a first action, (ii) a correspondence between a second password and a second action, and (iii) a correspondence between a third password and a third action comprises rotating a first password by the degree to create a password variant, wherein a degree to which the first password has been rotated is used to identify one of the first action, the second action, and the third action.

3. The method of claim 2, wherein rotating the first password by one degree comprises making a last character of the first password a first character of a rotated password and shifting remaining password characters right.

4. The method of claim 1, wherein sending a distress signal further comprises sending a periodic signal comprising updated location information.

5. The method of claim 1, wherein the mobile communications device is configured to execute the second action without providing a user interface indication that the second action is being performed.

6. A computer-implemented system for executing an action on a mobile communications device based on a received password, comprising:
a radio transceiver;
a processor; and
a computer readable memory encoded with instructions for commanding the processor to perform actions comprising:
identifying, at the mobile communications device, (i) a correspondence between a first password and a first action, (ii) a correspondence between a second password and a second action, and (iii) a correspondence between a third password and a third action; wherein the first action is to unlock the mobile communications device; where the second action comprises one of: sending false information to a display of the mobile communications device, indicating that a user interface of the mobile communications device has failed, or sending a distress signal via the radio transceiver to a public safety answering point; and wherein the third action comprises deleting at least a portion of information stored on the mobile communications device;
receiving, at the mobile communications device, a password which is one of the first password, the second password, or the third password;
searching for a degree within the received password, the degree being a string that does not exist in a stored authentic password associated with the mobile communications device; and
executing, at the mobile communications device, the action corresponding to the received password.

7. The computer-implemented system of claim 6, wherein identifying (i) a correspondence between a first password and a first action, (ii) a correspondence between a second password and a second action, and (iii) a correspondence between a third password and a third action comprises rotating a first password by the degree to create a password variant, wherein a degree to which the first password has been rotated is used to identify one of the first action, the second action, and the third action.

8. The computer-implemented system of claim 7, wherein rotating the first password by one degree comprises making a last character of the first password a first character of a rotated password and shifting remaining password characters right.

9. The computer-implemented system of claim 6, wherein sending a distress signal further comprises sending a periodic signal comprising updated location information.

10. The computer-implemented system of claim 6, wherein the mobile communications device is configured to execute the second action without providing a user interface indication that the second action is being performed.

11. A computer-readable memory encoded with instructions for commanding a processor to execute an action on a mobile communications device based on a received password, the instructions causing the processor to perform actions comprising:
identifying, at the mobile communications device, wherein the mobile communications device comprises a radio transceiver, (i) a correspondence between first password and a first action, (ii) a correspondence between a second password and a second action, and (iii) a correspondence between a third password and a third action; wherein the first action is to unlock the mobile communications device; wherein the second action comprises one of: sending false information to a display of the mobile communications device, indicating that a user interface of the mobile communications device has failed, or sending a distress signal via the radio transceiver to a public safety answering point; and wherein the third action comprises deleting at least a portion of information stored on the mobile communications device;
receiving, at the mobile communications device, a password which is one of the first password, the second password, or the third password;
searching for a degree within the received password, the degree being a string that does not exist in a stored authentic password associated with the mobile communications device; and
executing, at the mobile communications device, the action corresponding to the received password.

12. The computer-readable memory of claim 11, wherein identifying (i) a correspondence between a first password and a first action, (ii) a correspondence between a second password and a second action, and (iii) a correspondence between a third password and a third action comprises rotating a first password by a degree to create a password variant, wherein the degree to which the first password has been rotated is used to identify one of the first action, the second action, and the third action.

13. The computer-readable memory of claim 12, wherein rotating the first password by one degree comprises making a last character of the first password a first character of a rotated password and shifting remaining password characters right.

14. The computer-readable memory of claim 11, wherein sending a distress signal further comprises sending a periodic signal comprising updated location information.

15. The computer-readable memory of claim 11, wherein the mobile communications device is configured to execute the second action without providing a user interface indication that the second action is being performed.

* * * * *